July 17, 1956
H. R. BILLETER
2,754,639
CYLINDER HONE
Filed March 28, 1955
5 Sheets-Sheet 1
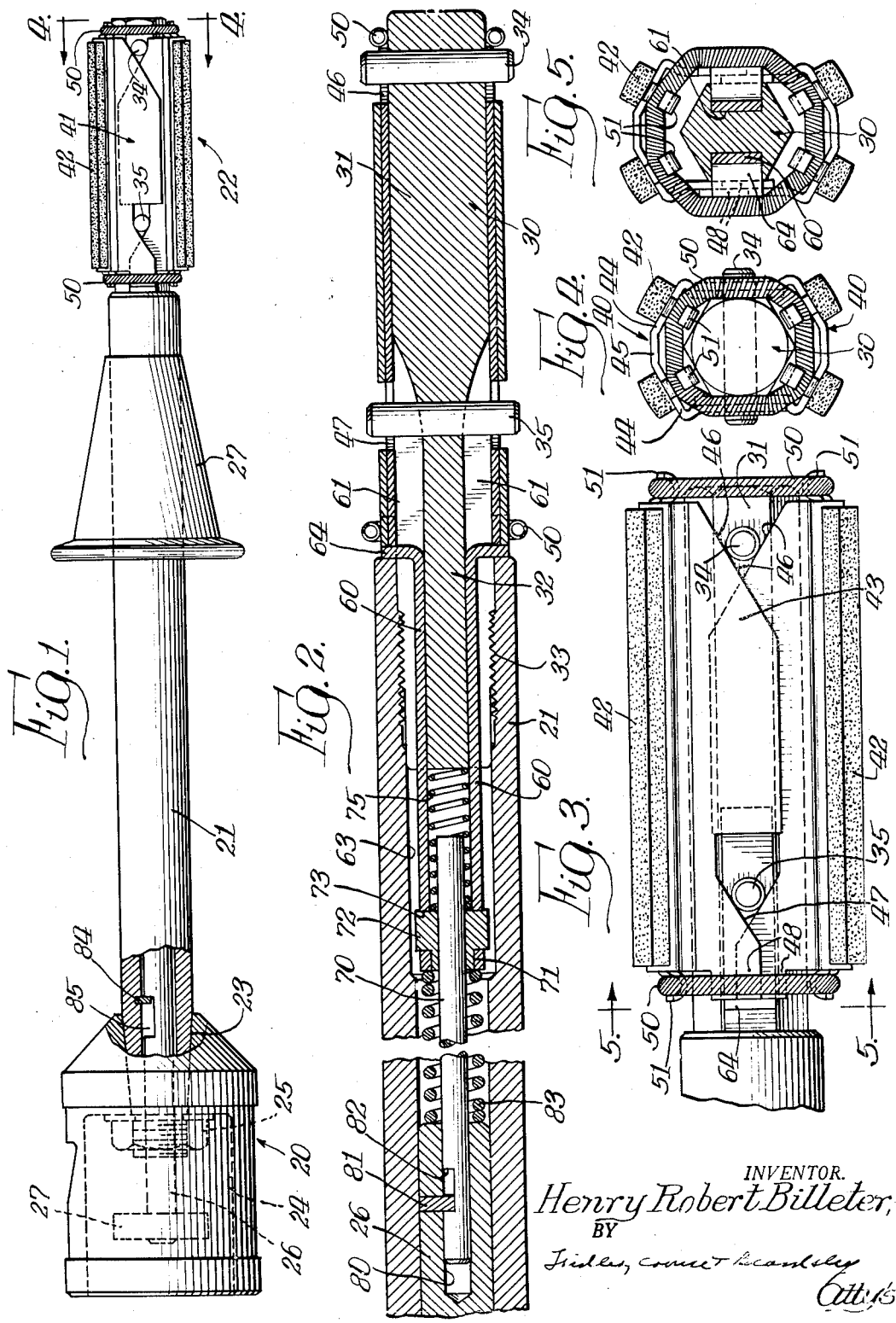
INVENTOR.
Henry Robert Billeter,
BY July 17, 1956  H. R. BILLETER  2,754,639
CYLINDER HONE
Filed March 28, 1955  5 Sheets-Sheet 2
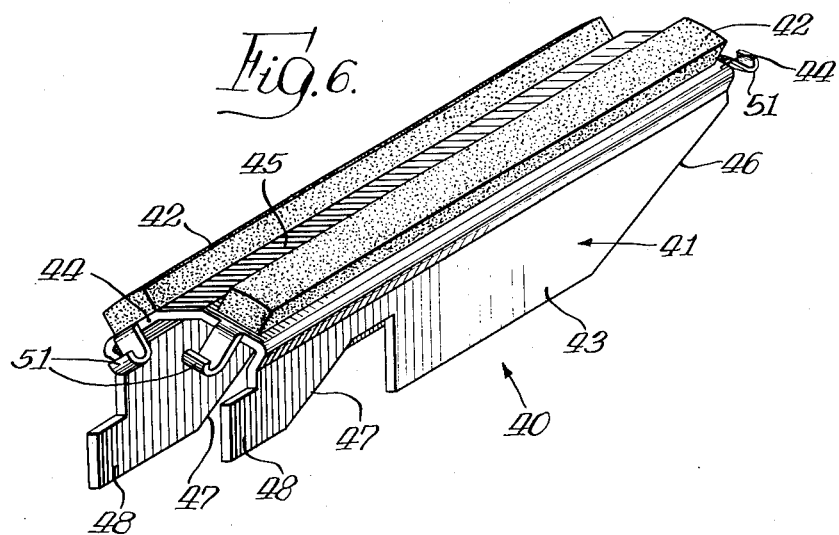
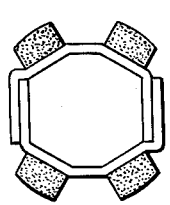
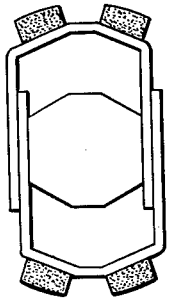
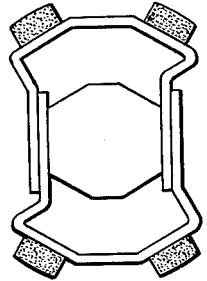
INVENTOR.
Henry Robert Billeter,
BY
Fidler Cause & Beardsley
Attys.

July 17, 1956  H. R. BILLETER  2,754,639
CYLINDER HONE
Filed March 28, 1955  5 Sheets-Sheet 3
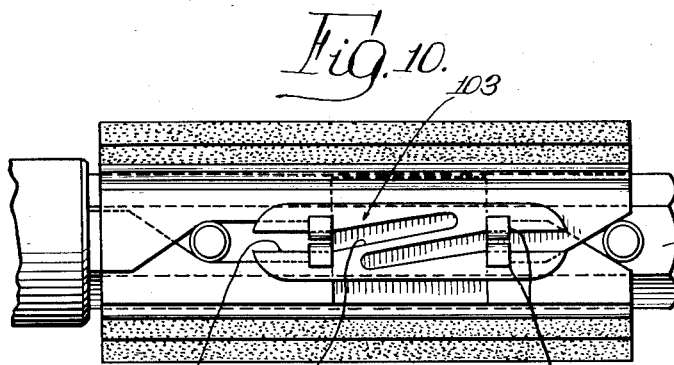
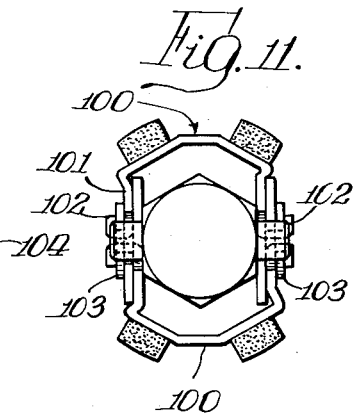
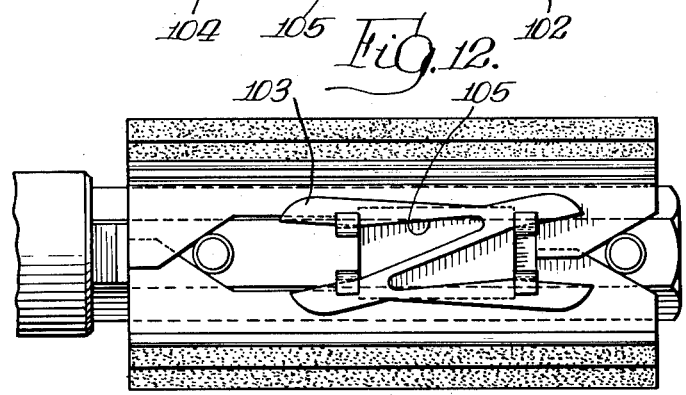
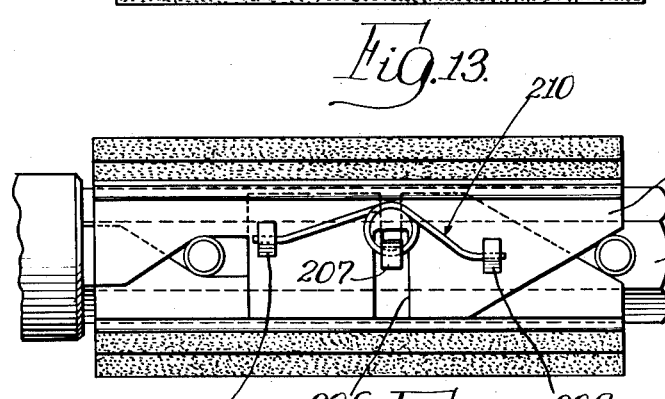
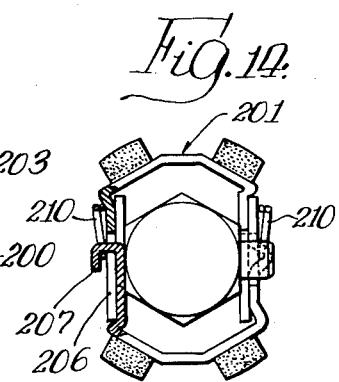
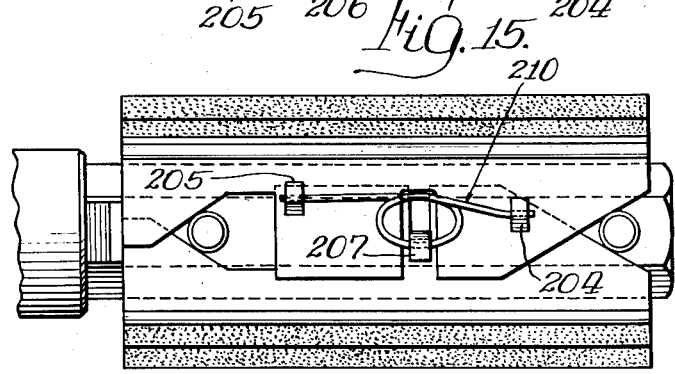
INVENTOR.
Henry Robert Billeter,
BY
Atty's.

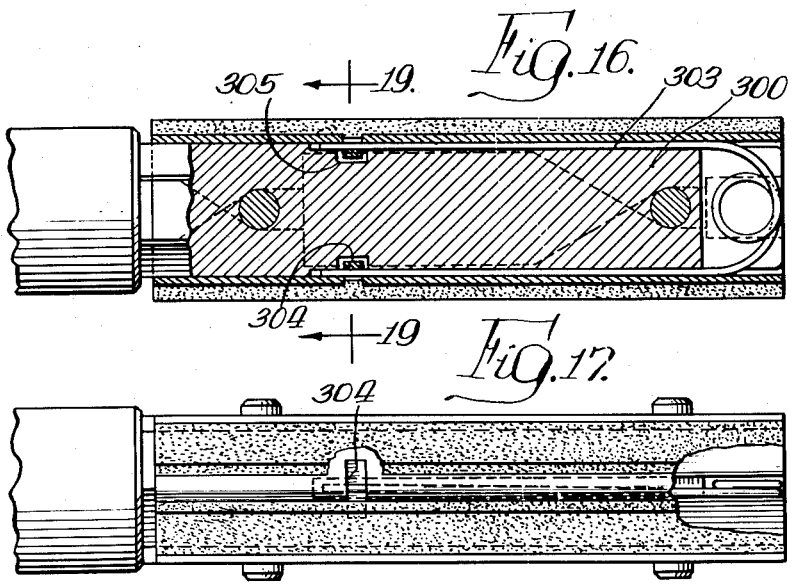
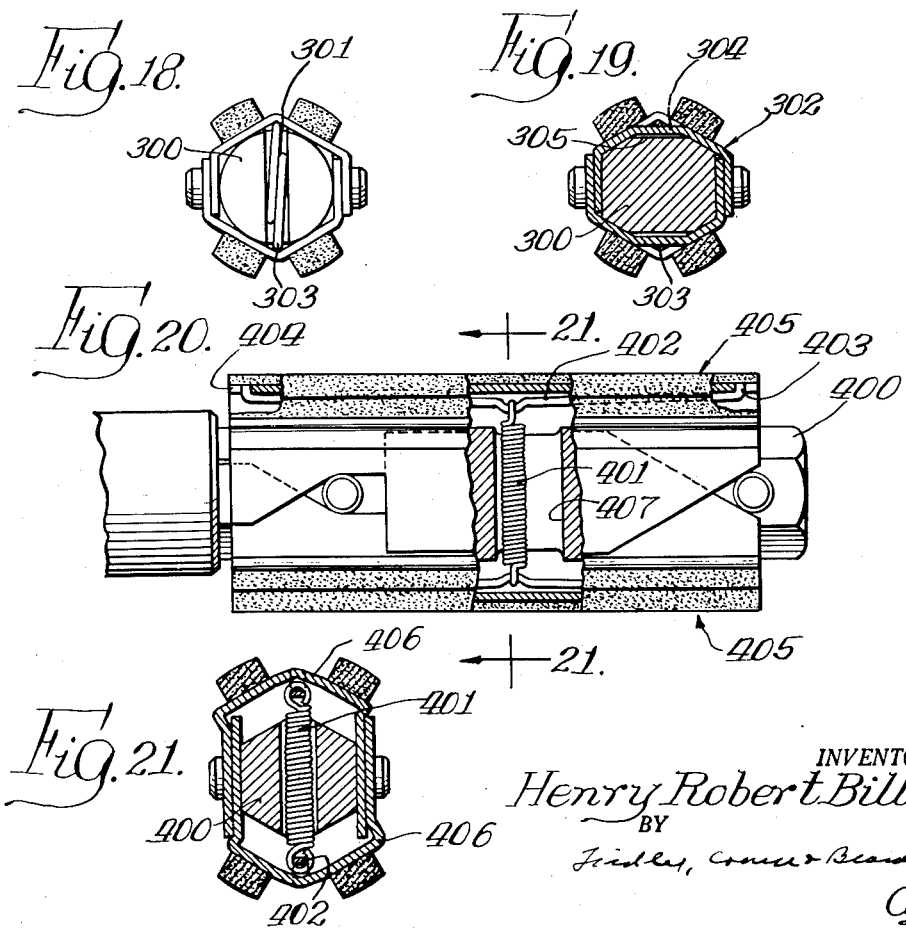

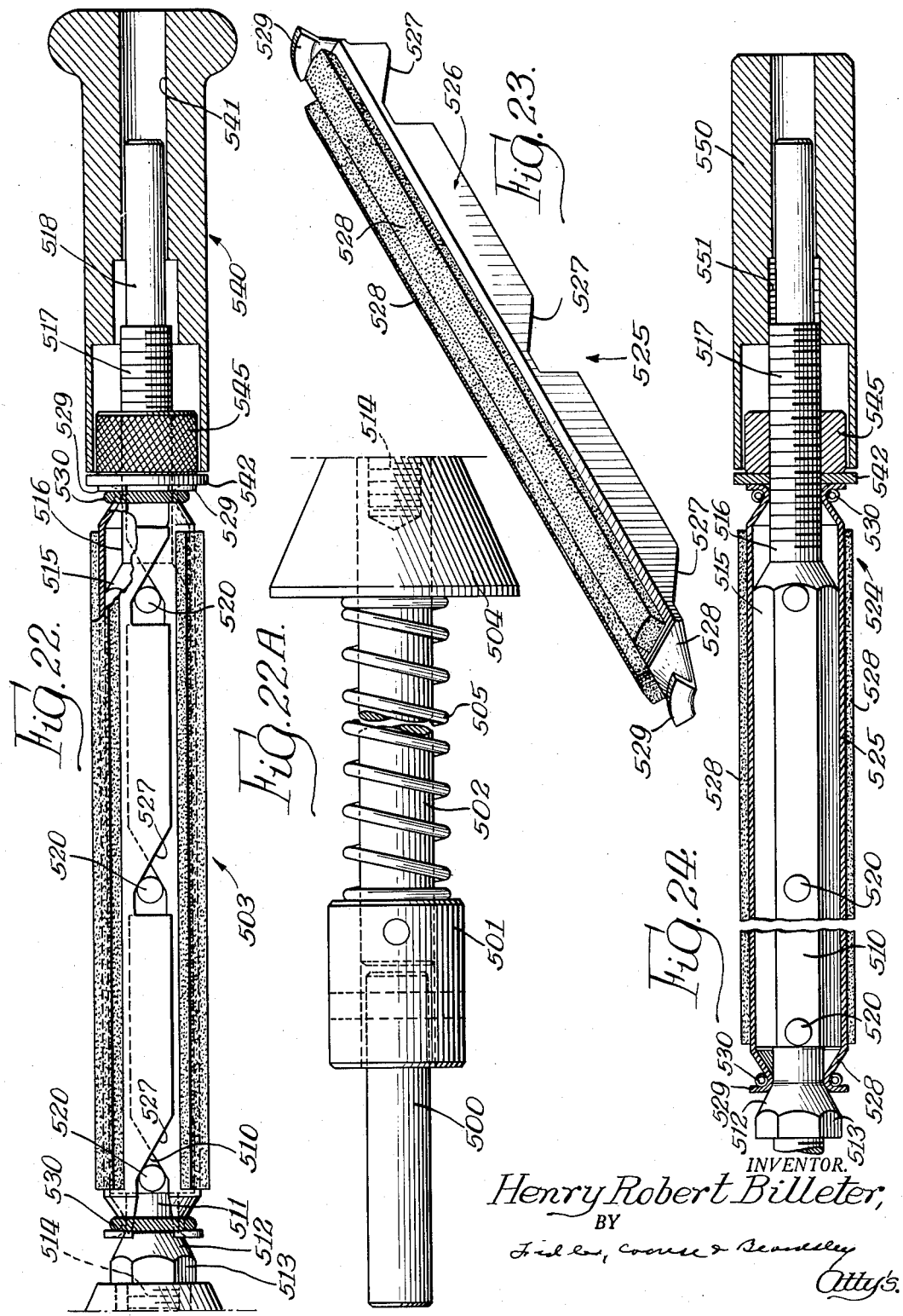

United States Patent Office 2,754,639
Patented July 17, 1956

2,754,639

CYLINDER HONE

Henry Robert Billeter, Deerfield, Ill., assignor to Ammco Tools, Inc., North Chicago, Ill., a corporation of Illinois Application March 28, 1955, Serial No. 497,128

7 Claims. (Cl. 51—184.3)

This invention relates generally to cylinder hones and has to do more particularly with a rotatable, expansible hone adapted for honing small cylinders such as brake cylinders, piston pin holes, bearing bushings and the like.

Expansible small bore hones have been constructed hereinbefore but they have been subject to certain disadvantages including particularly vibration or chattering. Owing to the nature of the cylinder walls to be honed, the engagement between the walls and the abrasive elements, or "stones" of the hone is not uniform with the result that at certain speeds of rotation of the hone the expansibly mounted abrasive units consisting of the stones and their respective carriers tend to vibrate. In many prior small bore hones, the abrasive elements are mounted for relatively free expansion, as by cam elements, and are restrained against such expansion solely by spring elements, such restraint being inadequate to prevent vibration or chattering. Also, in expansible small bore hones of the type wherein the abrasive units are expanded by cams, the cam surfaces have been formed either by machining which is relatively expensive, or by die-casting the abrasive carriers in which latter case it is very difficult to insure the accuracy necessary to satisfactory functioning of the hone.

An object of the present invention is to provide an expansible small bore hone which is capable of honing a cylinder to a higher degree of accuracy than prior hones.

Another object of the invention is to provide a rotatable, expansible cylinder hone wherein vibration of the abrasive unit is substantially eliminated.

Still another object of the invention is to provide a rotatable, expansible cylinder hone wherein the abrasive units may be easily and accurately and inexpensively formed.

Another object of the invention is to provide a rotatable expansible hone wherein the abrasive units are of such construction and so mounted that they are expanded in a true radial direction and are effectively restrained against rocking or tilting movement in the course of operation.

A further object is to provide a stone carrier of extremely simple construction which can be accurately formed at a minimum of expense.

Another object of the invention is to provide a rotatable expansible hone having removable abrasive units which can be removed and replaced quickly and easily.

Other objects of the invention will appear from the following description taken in connection with the accompanying drawings, in which:

Figure 1 is a side elevational view of a "push type" hone constructed in accordance with my invention;

Fig. 2 is an enlarged fragmentary, longitudinal sectional view taken through the outer end of the hone of Fig. 1;

Fig. 3 is an enlarged fragmentary side elevational view of the head portion of the hone of Fig. 1, and showing the abrasive units in partially expanded condition;

Fig. 4 is an end elevational view of the head of Fig. 1 in contracted condition;

Fig. 5 is a view of a cross section taken along the line 5—5 of Fig. 3;

Fig. 6 is an enlarged, perspective view of one of the abrasive units of the hone of Fig. 1;

Fig. 7 is a somewhat diagrammatic view showing the relationship of the body and the two abrasive units of a honing head designed for honing small size bores;

Fig. 8 is a view similar to Fig. 7 and showing the same body but showing for the sake of comparison two abrasive units used for honing a larger bore than the units of Fig. 7;

Fig. 9 is a view similar to Fig. 8 and showing the same body but somewhat differently shaped abrasive carriers.

Fig. 10 is a side elevational view of a second embodiment of the hone, with the abrasive units shown in contracted condition;

Fig. 11 is an end view of the hone of Fig. 10;

Fig. 12 is a view similar to Fig. 10 except showing the abrasive units in expanded condition;

Fig. 13 is a side elevational view of a third embodiment of the invention;

Fig. 14 is an end elevational view, partially in cross-section, of the hone of Fig. 13;

Fig. 15 is a view similar to Fig. 13 except showing the abrasive units in expanded condition;

Fig. 16 is a side elevational view of a further embodiment of the invention;

Fig. 17 is a view of a longitudinal section taken through the hone of Fig. 16 along a plane normal to the plane of the drawings;

Fig. 18 is an end elevational view of the hone of Fig. 16;

Fig. 19 is a view of a section taken along the line of 19—19 of Fig. 16;

Fig. 20 is a side elevational view partially in cross section of still another embodiment of the invention;

Fig. 21 is a view of a cross section taken along the line 21—21 of Fig. 20;

Figs. 22 and 22A together constitute a side elevational view, partially in cross-section of a manually actuated push type hone;

Fig. 23 is a perspective view of the abrasive unit of the reduction shown in Figs. 22 and 22A; and Fig. 24 is a longitudinal sectional view of a preset honing head embodying my invention.

Referring now particularly to Figs. 1 to 5 inclusive, the preferred form of my hone includes a drive adapter 20 providing means for directly mounting a hone on a honing machine (not shown) for rotatably driving the hone. A tubular drive shank 21 carries at one end a honing head 22 and at the other end is tapered as at 23 and is inserted in a correspondingly shaped opening in the drive adapter 20, with the end of the shank projecting into the cavity or hollow portion 24 of the drive adapter. The inner end of the drive shank is threaded for receiving a nut 25 which secures the shank in the drive adapter. A push rod 26 is slidably mounted in the tubular drive shank 14, with one end extending beyond the end of the shank and into the cavity 24 and carrying a pressure button 27 for engagement by suitable means (not shown) for advancing the push rod 26 and thereby expanding the abrasive units of the head as hereinafter described. Slidably and rotatably mounted on the drive shank is a centering cone 27 for the usual purpose.

The honing head 22 includes a body 30 having a head portion 31 of hexagonal cross sectional shape and a stem portion 32 of circular cross section, the latter being formed with threads 33 and screwed into the outer end of the shank 21. Suitably secured in the head portion 31, as by force fitting, is a pair of cam pins 34 and 35 which are arranged with their axes parallel and in a longitudinal medial plane of the head portion 31. The cam pins 34 and 35 project laterally from both sides of the head portion 31 a sufficient distance to provide cam elements for cooperation with the abrasive units hereinafter described.

Mounted on the head portion 31 is a pair of identical abrasive units one of which is illustrated in Fig. 6 of the drawings. Each abrasive unit 40 includes a carrier 41 formed of metal such as steel and a pair of abrasive elements or "stones" 42 secured to the carrier. Each carrier 41 takes the general form of a channel having spaced parallel flanges 43 connected by a web formed with two face portions 44, lying substantially in planes at 120° apart, the two portions 44 being connected by a central flat portion 45. The abrasive elements or "stones" 42 are secured in a suitable manner to the outer faces of the web portions 44, as by the usual adhesive. As explained hereinafter, in certain cases the central flat portion between the two face portions may be omitted and the web formed merely by the two face portions.

The two flanges 43 are similar and the free edges of each are formed with inclined parallel cam surfaces 46 and 47. The forward or outer cam surfaces 46 is disposed to extend downwardly from the outer end of the carrier to the outer free edge of the flange 43. The inner or rear cam surface 47 is formed in a notched portion of the free edge of the flange.

Each of the flanges 43 is provided with an extension 48 which projects rearwardly, or inwardly, beyond the inner end of the web for a purpose which will hereinafter appear.

The abrasive units 40 are mounted on the head portion 31 in opposed relation, with the flanges of each of the carriers 41 embracing and receiving the head portion 31. As will be seen particularly from Figs. 3 and 4, the carriers are arranged so that the flange of one of the carriers is on the outside of the flange of the other carrier on one side of the head portion 31 and the other flange of the first-named carrier is on the inside of the flange of the other carrier at the other side of the head portion 31. The cam surfaces 46 and 47 are so arranged that they bear against the cam pins 34 and 35 respectively on both sides of the head portion 31. The cam surfaces 46 and 47 and the cam pins 34 and 35 are so disposed relatively in a longitudinal direction that when the abrasive units are in their innermost or contracted positions relative to the head portion 31 the cam pins bear against the upper portions of the cam surfaces 46 and 47 and when the abrasive units are in their expanded positions the cam pins bear against the lower portions of the cam surfaces 46 and 47.

The abrasive units 40, are slidably carried on the head portion 31 for movement in a direction longitudinally along the head portion 31 as well as for expansion and contraction in a radial direction. It will be seen, therefore, that movement of the abrasive units 40 in a forward or outer direction on the head portion 31 will cause the abrasive units to be cammed outwardly toward their expanded positions and conversely movement of the abrasive units in an inward or rearward direction will permit them to be contracted.

For the purpose of retaining the abrasive units 40 on the head portion 31 and for urging them yieldably toward their retracted positions suitable retaining and retracting means are provided. In the embodiment of the invention illustrated in Figs. 1 to 5 inclusive the retaining and retracting means comprises a pair of helical garter springs 50, which are engaged over hooks 51, formed integrally with the webs of the carriers respectively. The garter springs 50 also pass outwardly around the extensions 48 of the flanges 43, which latter thereby serve to prevent the garter springs from interfering with the action of the push bars now to be described.

Means are provided for transmitting the outward or projecting movement of the push rod 26 to the abrasive units 40, in order to move them outwardly of the head portion 31 and thereby cause them to be cammed in a radially outward direction toward their expanded positions. To this end, a pair of push bars 60, are provided which are slidably disposed in grooves 61, formed in the head portion 31 at diametrically opposite locations which grooves continuously through the shank portion 32 and open into the interior 63 of the shank 21. Each of the push bars 60 is provided with an out-turned end 64 of sufficient radial dimension to extend outwardly across the end edges of the corresponding flange extensions and to abut such end edges. Preferably, the outwardly turned portions 64 of each of the bars 60 does not extend beyond the outer diameter of the shank 21, as illustrated particularly in Fig. 2 of the drawings.

Each of the push bars 60 is connected at its inner end to a push rod 70 the function of which will be described hereinafter. The push rod 70 has secured thereto in a suitable manner a collar 71 having diametrically opposed projections or lugs which are received in correspondingly shaped and arranged openings 73 adjacent the inner ends of the push bars 60 whereby the push bars are connected to the collar 71 for movement in either direction in accordance with the movement of the push rod 70. Interposed between the inner end of the body shank 32 and the outer end of the collar 71 is a coiled spring 75 which is normally under compression and adapted to move the push rod 70 inwardly and thereby retract the push bars 60 in order to permit the abrasive units 40 to be contracted by their contracting springs 50.

The push rod 70 has its inner end slidably disposed in a bore 80 formed in the outer end of the first push rod 26, such movement being limited by a pin 81 projecting into the bore and having its free end disposed in a notched portion 82 in the second push rod 70. Surrounding the second push rod 70 and bearing at its inner end against the outer end of the first push rod 26 and at its outer end against the inner ends of the push bars 60 is a preloaded spring 83. The latter is preloaded by limiting of the inward sliding movement of the first push rod 26 whereby the spring 83 is maintained under compression between the first push rod 26 and the inner ends of the push bar 60. To this end, a pin 84 is fixed in the shank 21 and projects into a notch 85 formed in the first push rod 26. The construction is such that upon movement of the first push rod 26 in an outward or expanding direction it acts through the spring 83 to urge the second push rod 70 in an outward direction unless or until the expanding abrasive units meet with sufficient resistance to overcome the expansive force of the spring 83 in which event the push rod 26 moves relatively to the second push rod 70 until the pin 81 contacts the outer wall of the notch 82.

In the use of my hone for honing small bores, the hone is connected to any suitable machine, for example, a honing machine (not shown) having rotatable drive means and means for actuating the pressure button. The head 22 is inserted in the cylinder or bore (not shown) that is to be honed, with the head in the contracted condition of the abrasive units. The units are then expanded to bring the outer surfaces of the stones into engagement with the walls of the cylinder or bore to be honed, by actuating the machine to cause the first push rod 26 to be moved outwardly. Outward movement of the push rod 26 causes the push bars 60, to be moved outwardly. The push bars 60, are slidably moved outwardly along their respective grooves or slots 61 and since the out-turned end portions 64 bear against the inner edges of extensions 48 the abrasive units 40 are moved outwardly in a longitudinal direction along the head portion 31. This outward movement causes the abrasive units 40, to be cammed in an outwardly radial direction against the retracting force of the springs 50 and the stones or abrasive elements 42 are moved outwardly into engagement with the walls of the cylinder or bore.

During the honing operation the shank 21 and the honing head carried thereby are rotated with the faces of the cylinder or bore and the walls thereby are honed to the desired extent. Expansion of the abrasive units is controlled by the control means (not shown) which operate on the pressure button 27 to apply an outwardly directed force on the first push rod 26. Under normal conditions this force acts through the spring 83 to apply a similar force to the push bars 60. However, should the pressure applied to the pressure button 27 exceed the loading of the spring 83, the latter will be further compressed and permit the first push rod 26 to move outwardly without corresponding movement of the second push rod 70 which action will be noticed by the operator who will thereby be informed that an excessive pressure is being applied to the pressure button 27.

When the honing has been completed, the operator releases the pressure on the control means which thereby releases the pressure on the pressure button 27 and permits the retracting spring 75 to urge the collar 71 inwardly which causes the push bars 60 to be drawn inwardly and thus the abrasive units 40, are permitted to be retracted by the retracting springs 50, whereupon the honing head may be readily removed from the cylinder or bore.

During the honing operation, at which time the honing head is being rotated within the cylinder or bore, there is a "drag" on the abrasive units resulting from the friction between the abrasive stones and the walls of the cylinder or bore. Thus, there is a force tending to rock or tilt the abrasive units on the head portion 31. This force however is resisted by the engagement between the cam surfaces 46 and 47 and the cam pins 34 and 35 at the trailing side of each abrasive unit. Moreover, the flanges of the carriers at each side of the head portion 31 are in engagement with each other and with the flat side faces of the head portion 31 which further serves to resist any tilting or rocking movement of the carriers on the head portion 31.

Vibration or chattering movement in a radial direction is resisted by the engagement between the flanges of the respective carriers with each other and with the flat side walls of the head portion 31.

When the stones have become worn to an extent which renders it desirable that they be replaced, the abrasive units may be removed from the body 30 by mere removal of the garter spring and then removal of the abrasive units simply by an outward separating movement. Two replacement abrasive units may be reassembled on the body 30 merely by engagement thereof over the head portion 31 with the flanges of one carrier offset to one side of the flanges of the other carrier and then bringing them into close relation with the head portion 31 after which the garter springs are engaged over the hooks 51 at the ends of the two carriers.

Various modifications may be made in the honing head and particularly in respect to the abrasive unit retaining and retracting means.

A second embodiment of the invention is shown in Figs. 10 to 12 inclusive wherein is provided another form of retaining and retracting means for the abrasive units. In this form of the invention, the body 30 and the actuating means for the abrasive units (not shown) are similar to the corresponding elements of the first embodiment of the invention. The abrasive units 100, are similar to the abrasive units 40, of the first described form of the invention except that the carriers do not have the end hook portions for receiving garter springs and no garter springs are provided. Instead, each of the flanges 101 of each of the carriers is provided with two spaced hooks 102 bent outwardly from the flange and then back to a position generally parallel with the flange at points intermediate the ends of the flange and between the two inclined cam surfaces.

A spring member 103 is provided at each side of the assembled abrasive units and is adapted to engage the two hooks of each of the two adjacent flanges at the corresponding side of the assembly in such manner as to yieldably retain the abrasive units against expansion and at the same time to retain the abrasive units in position on the body 104. Each spring member 103 is formed preferably by punching of the same from a metal plate. The spring member is provided with two long slots each of which has a portion 104 extending inwardly from one end and along the medial longitudinal axis of the member 103 and a continuation portion 105 which is inclined away from the longitudinal medial axis with the portion 105 of the two slots being spaced, parallel and overlapping for a substantial extent. The two straight slot portions 104 are of such dimensions and so arranged that they receive therein the corresponding hooks of the two abrasive units on the one side of the assembly as shown particularly in Fig. 10 of the drawings. The spring members 103 are formed of resilient material such as spring steel so that they tend to return to their initial shape and condition after being stressed and spread in the manner hereinafter described.

The abrasive units 100 are expanded in a manner similar to that described in connection with the first embodiment of the invention. Such expansion causes the material of the spring member 103 on either side of the two slots to be spread apart as illustrated particularly in Fig. 12 of the drawings against the natural resistance of the resilient material forming the spring member 103. When the expanding force on the abrasive units is released, the spring member 103 returns to its initial shape and thus contracts the abrasive units to their initial position.

A third embodiment of the invention is illustrated in Figs. 13 to 15 inclusive wherein is shown another form of retaining and retracting springs. In this form of the invention, the body 200 and the actuating means (not shown) are the same as in the first form of the invention. The abrasive units 201 likewise are generally similar to the abrasive units described in connection with the first form of the invention except that they are not provided with end hooks and the flanges of the carriers are so formed as to receive and retain a loop type spring 210 at each side. As in the first embodiment of the invention, the two carriers are identical in construction. However, in the case of the third embodiment, the two flanges of the single carrier are not similar in construction.

In this embodiment of the invention, one of the flanges 203 is provided with a pair of tongues 204 and 205 struck up from the material of the flange and the flange intermediate the tongues is provided with a deep slot 206. At the other side of each carrier, the flange is provided with a hook 207 struck up from the material of the flange and projecting outwardly therefrom. The hook is so disposed that when the carriers are in assembled relation as illustrated particularly in Figs. 13 to 15, the hook 207 of each carrier projects outwardly through the slot of the other carrier.

A loop spring 210 is disposed at each side of the assembly with one end or leg disposed in the tongue 204 and the other end in the tongue 205 with the loop engaged in the hook 207 of the other carrier. A similar loop spring is provided at the other side of the assembly and is engaged with the tongue and hook of the carrier in a similar manner.

When the abrasive units 201 are expanded, the spring member 210 is stressed in such manner as to yieldably resist such expansion and to apply to the abrasive units a force tending to urge them back into contracted position.

Still another embodiment of the invention is illustrated in Figs. 16 to 19 to which reference now is made.

In this embodiment of the invention, the head portion 301 of the body is formed in a generally similar manner to the head portion of the bodies hereinabove described. However, the body 301 is formed with grooves 301 which extend longitudinally therealong throughout the major portion of the length at diametrically opposed portions as illustrated particularly in Figs. 17 and 18. The abrasive units 302 are generally similar to the abrasive units hereinabove described. It will be noted, however, that the carriers forming portions of the abrasive unit are shown as having relatively short or narrow flanges whereby the abrasive units may be contracted into contact with the upper and lower pairs of faces of the head portion and thus the abrasive units in contracted position provide a honing head of minimum diameter.

The retaining and contracting spring 303 takes the form of a hairpin spring the legs of which are disposed in the grooves 301 respectively and pass through straps 304 bent out of the webs of the respective carriers to permit the legs of the spring 303 to be received between such straps and the adjacent portion of the web of the carrier whereby the spring 303 serves both to retain the abrasive units in position and to resist expansion of the unit.

Upon expansion of the abrasive unit, the spring 303 is stressed and yieldably resists such expansion and when the expansion force is removed the spring 303 causes the abrasive unit to be contracted against the head portion 300.

Still another embodiment of the invention is illustrated in Figs. 20 and 21 wherein the head 400 and the abrasive units 405 are generally similar to those hereinabove described.

The head 400 is provided with a bore extending transversely therethrough to receive a coiled spring 401 which is anchored at its two ends respectively to resilient straps 402 each having its ends 403 turned up and engaging the end edges of the two carriers 406 respectively, the webs of the carriers being formed with notches 404 in their end portions to receive the turned up ends 403 of the straps 402. The spring 401 is under slight tension whereby it applies a slight inwardly directed force to the central portion of each of the two straps 401 which causes the straps to bow inwardly, whereby the end portions 403 of each strap firmly bear against the end edge portions of the corresponding carrier 406 and tightly grip the carrier. The coil spring 401 thus serves to retain the abrasive units against separation and to yieldably oppose any expansion thereof. When the abrasive units are expanded, the spring 401 is further tensioned and yieldably opposes such expansion and thus when the expansive force is removed, the abrasive units are returned to their initial contracted position.

In accordance with the present invention, the honing head is adapted for honing cylinders through a substantial range of sizes. To this end, there is provided for each size of body a set including a plurality of pairs of abrasive units of different sizes whereby any pair of units of such set may be assembled with the body to hone the cylinder or bore in accordance with the size of the cylinder or bore. It will be understood, of course, that because of the expansibility of the honing head of the present invention, each different set of abrasive units may be used with the body to hone any one of a number of differently sized cylinders throughout a predetermined range. For example, in one specific example, a honing head consisted of a single body and three sets of differently sized abrasive units adapted to hone cylinders as follows. The first set of abrasive units was dimensioned to permit honing of cylinders from $47/64$ inch to $15/16$ inch in diameter; the second set of units was dimensioned to permit honing of cylinders ranging from $15/16$ inch to $1\frac{1}{8}$ inches; and the third set of abrasive units was dimensioned to permit honing of cylinders ranging from $1\frac{1}{8}$ inches to $1\frac{1}{4}$ inches in diameter.

It has been desirable that in order to provide sufficient stability of the honing head that the abrasive elements or stones be so located on the carriers that the medial longitudinal planes passing through the abrasive elements normal to the working surfaces thereof intersect at an angle of approximately 60 degrees and at a point located at or near the axis of the body 30. Where the flanges of the abrasive carriers are narrow and the carriers therefore in their contracted positions, are disposed closely adjacent the walls of the body, the stones are located at the desired angle of approximately 60 degrees. Furthermore, in this case, even when the abrasive units are in expanded condition the stones are so located that the medial planes passing therethrough intersect at an angle of not substantially less than 60 degrees. A body having associated therewith a pair of abrasive units adapted for honing a cylinder of minimum size range corresponding to the particular honing head is illustrated diagrammatically in Fig. 7.

The same body having assembed therewith abrasive units adapted to hone a cylinder of large size is illustrated diagrammaticaly in Fig. 8. It will be seen that even when the abrasive units are in their contracted positions, the angle between the medial longitudinal planes through the working surfaces of the stones intersect at the axis of the head at an angle of considerably less than 60 degrees.

In order to provide for the desired angular relation between the stones, I construct the stone carriers as illustrated somewhat diagrammatically in Fig. 9 wherein is shown the same body as in Figs. 7 and 8. Each of the carriers of Fig. 9 is constructed in a manner generally similar to the carriers of Fig. 8 and located at the same distance from the axis of the head. However, in order to locate the stones in the desired angular relation the web portions of the carrier are formed somewhat differently than the web of the carrier of Fig. 8. It will be noted that the stone carrying portions of the web are extended outwardly beyond the flanges whereby the stones may be properly located to provide the desired angular relationship. The stone carrying portions of the web are joined to the flanges by inclined portions as illustrated.

The invention also is applicable to hones of the manually expandable type wherein the hone is suitably rotated as by an electric drill and the abrasive units are so arranged as to be expanded into contact with the cylinder walls by manually actuating an expansion knob. A hone of this type embodying the present invention is illustrated in Figs. 22 to 24 to which reference now is made.

The hone includes a drive shank 500 connected through a universal coupling of known construction 501 to a drive stem 502 which carries the honing head 503. A centering cone 504 urged outwardly by a spring 505 is provided for the usual purpose.

The honing head 503 includes a body 510 which throughout its major portion is of hexagonal cross-section similar to the honing head bodies hereinbefore described. At its inner end the body 510 is formed with a short cylindrical portion 511 merging into an outwardly flared conical portion 512 beyond which is a hexagonal nut portion 513 and finally a threaded stem 514 by which the head is screwed into the end of the shank 502 formed with a threaded bore for this purpose. At its outer end the body is formed with a conical portion 515 and a cylindrical portion 516 which is threaded as at 517 and beyond which is a reduced unthreaded portion 518.

Suitably secured in the head portion 510 as by force fitting are three cam pins 520 arranged in a manner generally similar to the cam pins 35 of the embodiment of the invention hereinabove described which cam pins 520 project laterally from the body a sufficient distance to provide cam elements for cooperation with the abrasive units now to be described.

The head 503 includes a pair of abrasive units 505 which are formed in a manner generally similar to the abrasive units 40 hereinabove described but vary in certain details which are now to be pointed out. Each of the units 525 includes a carrier 526 generally similar in form to the carrier 41 except that the carrier 526 is provided with three inclined edge portions 527 forming cam surfaces for cooperation respectively with the cam pins 520. Each abrasive unit 525 also includes a pair of abrasive elements 528 which are generally similar to and are mounted in a manner generally similar to the mounting of the abrasive elements 42 hereinabove described.

The carrier 526 is formed at its ends in a manner somewhat different from the carrier 41 above described. At each end of the carrier 526 there is provided an extension of part-conical form 528 and at the outer end of such extension is an upturned end flange 529.

The two abrasive units 525 are carried on the body 510 in a manner generally similar to that in which the units 41 are carried on the body 30 and they are retained thereon by garter spring 530 at the ends which serve both to retain the abrasive units on the body and to urge the units toward contracted position.

The abrasive units 525 are adapted to be expanded on the body 510 by a push expansion knob 540 which is carried on the outer end of the body 510. The knob 540 is formed with a bore 541 of stepped form which permits the knob to be telescoped over the projecting end of the body 510 and to abut against a bearing washer 542 which is slidably mounted on the outward extension of the body 510 in position to abut against the outer faces of the end flanges 529 of the carriers 526. A stop-nut 545 is threaded onto the threaded portion 517 of the body 510 in order to limit the movement of and position the abrasive units 525.

It will now be seen that the abrasive units 525 may be expanded on the body 510 by motion of the push-expansion knob 540 in an inward direction (to the left as viewed in Fig. 22A). This inward movement of the knob 540 causes the abrasive units 525 to be moved inwardly and as a result to be expanded by the cam action between the pins 520 and the cam surfaces 527.

In the use of the hone illustrated in Figs. 22 and 22A, the head 503 after attachment to the drive shank, and with the knob 540 removed, is inserted into the cylinder (not shown) to be honed with the outer end of the body beyond the abrasive units 525 projecting from the cylinder. Thereafter the push-expansion knob is disposed on the end of the body and the hone is ready for use. The hone is rotated in a suitable known manner while in the cylinder and the abrasive units are expanded into engagement with the walls of the cylinder to be honed and are maintained in such engagement by pressing on the push-expansion knob to the extent necessary to effect and maintain such engagement. When the honing has been carried out to the desired extent, the operator releases the pressure on the push-expansion knob and removes the latter whereupon the hone may be removed from the cylinder.

A honing head 524 of the pre-set expansion type embodying my invention is illustrated in Fig. 24 of the drawing to which reference now is made.

The honing head 524 is generally similar in construction to the head of the hone illustrated in Figs. 22 and 22A and just above described, except in respect to the knob which, in the present case is adapted to be set to and maintained in a predetermined position of adjustment in order to maintain the abrasive units in a predetermined expanded condition instead of being operable manually to maintain the units in such an expanded position.

In this form of the invention, the body 510, the two abrasive units 525, the bearing washer 542 and the stop nut 545 all are preferably similar in construction to the corresponding elements illustrated in Figs. 22 and 22A. The screw expansion knob 550 is generally similar in construction to the knob 540 except that it does not have the enlarged outer end portion for the application of manual pressure but instead is of uniform diameter throughout and preferably is of no larger diameter than the push washer 542. In addition, the knob 550 is provided with threads 551 adapted to cooperate with the threads on the portion 517 of the body shank whereby the knob 550 may be screwed on to the portion 517 and held in any desired position of adjustment within the range provided in the honing head.

In the use of the hone of Fig. 24, the knob 550 remains thereon. The head is passed through the cylinder to be honed and thereafter the knob 550 is turned to a sufficient extent to bring the abrasive elements into engagement with the wall of the cylinder to be honed whereafter the hone is rotated to hone the surfaces. As the cylinder wall surfaces are honed adjustment may be made in the expansion of the honing elements by stopping the rotation of the hone and turning up the knob 550. After the honing has been completed the hone may be removed from the cylinder without first removing the knob 550.

It will be seen from the foregoing that the present invention provides a hone having a number of important advantages. The hone of the present invention provides a rigid and firm support for the abrasive elements whereby they are restrained against undesirable vibration or chattering. Morover, the hone and particularly the abrasive units are of simple construction whereby while the hone may be formed relatively inexpensively but at the same time the hone is rugged and durable and requires little, if any, servicing or replacement of parts over a long period of use.

The hone is of such construction that the abrasive units can be quickly and easily removed and replaced whenever the abrasive elements have worn to such an extent as to render such replacement desirable.

The abrasive units are of such construction and are so mounted that they are expanded in a true radial direction and are effectively restrained against rocking or tilting movement and thus the hone is effected to hone the walls of a cylinder with a high degree of accuracy.

Owing to the construction of the hone of the present invention, it may be so formed that when in contracted condition, the abrasive stones do not extend substantially beyond the diameter of the hone shank. Since the body which carries the abrasive unit is substantially solid and is provided only with the two grooves which receive the push bars, the body even though made of a relatively small diameter is relatively strong and rigid.

The carriers are of such construction that they may be contracted into close relation with the body. On the other hand, the carriers may be provided with relatively deep flanges whereby they may be expanded to a substantial extent on the hone head body. It will be understood, of course, that the extent of contraction of the carriers is limited by the height of the flanges.

The hone of the present invention is extremely simple in construction and can be manufactured readily and at comparatively little expense. It will be noted that the parts are of such construction that there are a minimum of machine operations required in order to produce the parts. It should be noted particularly that the carriers are of such construction that they may be formed by punching blanks from metal plate or sheet material and then bending the blanks to produce the final form of carriers. This operation not only provides the advantage of inexpensive fabrication but also renders it possible to insure a high degree of accuracy of the cam surfaces. Abrasive stone carriers have been formed by die casting as in certain prior hones it has been very difficult to insure accuracy of the cam surfaces. The present invention overcomes this disadvantage inasmuch as it is very easy to insure that the cam surfaces are accurately located when the carriers are punched and bent or folded.

I claim:

1. A honing head comprising a body having a stem portion and a head portion formed with at least two parallel surfaces and cam elements projecting from said surfaces, a pair of abrasive units each including a generally channel-shaped carrier formed with parallel flanges, each said flange having a plurality of spaced, parallel and inclined edge portions defining cam surfaces and a web connecting said flanges and abrasive elements carried by said web, said abrasive units being carried on the head portion of said body with a first flange of each carrier lying against one of the parallel surfaces respectively of said body and the second flange of each carrier lying against the first flange of the other carrier, and with said inclined edge portions bearing against said cam elements, and resilient means connecting said abrasive units and yieldably retaining them against separation on said body.

2. A honing head comprising a body having a stem portion and a head portion formed with at least two parallel surfaces and cam elements projecting from said surfaces, a pair of abrasive units each including a generally channel-shaped carrier formed with parallel flanges and with hook elements at its ends, each said flange having a plurality of spaced, parallel and inclined edge portions defining cam surfaces and a web connecting said flanges and abrasive elements carried by said web, said abrasive units being carried on the head portion of said body with a first flange of each carrier lying against one of the parallel surfaces respectively of said body and the second flange of each carrier lying against the first flange of the other carrier and with said inclined edge portions bearing against said cam elements, and resilient means including springs engaging the hook element of said abrasive units for connecting said abrasive units and yieldably retaining them against separation on said body.

3. A honing head comprising a body having a stem portion and a head portion formed with at least two parallel surfaces and cam elements projecting from said surfaces, a pair of abrasive units each including a generally channel-shaped carrier formed with parallel flanges having hook elements projecting laterally therefrom, each said flange having spaced, parallel and inclined edge portions defining cam surfaces and a web connecting said flanges and abrasive elements carried by said web, said abrasive units being carried on the head portion of said body with a first flange of each carrier lying against one of the parallel surfaces respectively of said body and the second flange of each carrier lying against the first flange of the other carrier and with said inclined edge portions bearing against said cam elements, and resilient means a spring element engaging the hook elements of said abrasive units respectively and yieldably retaining them against separation on said body.

4. A honing head comprising a body having a stem portion and a head portion formed with at least two parallel surfaces and cam elements projecting from said surfaces, a pair of abrasive units each including a generally channel-shaped carrier formed with parallel flanges, each said flange having spaced, parallel and inclined edge portions defining cam surfaces and a web connecting said flanges with a depressed strap connecting said flange and abrasive elements carried by said web, said abrasive units being carried on the head portion of said body with a first flange of each carrier lying against one of the parallel surfaces respectively of said body and the second flange of each carrier lying against the first flange of the other carrier and with said inclined edge portions bearing against said cam elements, and resilient means including a hair pin spring engaging the straps of said abrasive units respectively and yieldably retaining them against separation on said body.

5. A honing head comprising a body having a stem portion and a head portion formed with at least two parallel surfaces and cam elements projecting from said surfaces, a pair of abrasive units each including a generally channel-shaped carrier formed with parallel flanges, each said flange having spaced, parallel and inclined edge portions defining cam surfaces and a web connecting said flanges and abrasive elements carried by said web, said abrasive units being carried on the head portion of said body with a first flange of each carrier lying against one of the parallel surfaces respectively of said body and the second flange of each carrier lying against the first flange of the other carrier and with said inclined edge portions bearing against said cam elements, and resilient means connecting said abrasive units and yieldably retaining them against separation on said body, said last means including a pair of gripping elements engaging said carriers respectively and a coil spring extending through said body and connected at its ends to said gripping elements respectively.

6. A hone comprising a honing head including a body having a stem portion and a head portion formed with at least two parallel surfaces and cam elements projecting from said surfaces, a pair of abrasive units each including a generally channel-shaped carrier formed with parallel flanges, each said flange having spaced, parallel and inclined edge portions defining cam surfaces and a web connecting said flanges and abrasive elements carried by said web, said abrasive units being carried on the head portion of said body with a first flange of each carrier lying against one of the parallel surfaces respectively of said body and the second flange of each carrier lying against the first flange of the other carrier and with said inclined edge portions bearing against said cam elements, and resilient means connecting said abrasive units and yieldably retaining them against separation on said body, and a knob slidably mounted on said body and engageable with said units for moving them longitudinally along said body to thereby effect expansion thereof on said body.

7. A hone comprising a honing head including a body having a stem portion and a head portion formed with at least two parallel surfaces and cam elements projecting from said surfaces, a pair of abrasive units each including a generally channel-shaped carrier formed with parallel flanges, each said flange having spaced, parallel and inclined edge portions defining cam surfaces and a web connecting said flanges and abrasive elements carried by said web, said abrasive units being carried on the head portion of said body with a first flange of each carrier lying against one of the parallel surfaces respectively of said body and the second flange of each carrier lying against the first flange of the other carrier, with said inclined edge portions bearing against said cam elements, and resilient means connecting said abrasive units and yieldably retaining them against separation on said body, and a knob threaded on said body and engageable with said units for adjusting them longitudinally of said body to thereby effect expansion adjustment of said units on said body.

References Cited in the file of this patent

UNITED STATES PATENTS

| | | |
|---|---|---|
| 1,904,336 | Sunnen | Apr. 18, 1933 |
| 2,663,124 | Smole | Dec. 22, 1953 |